United States Patent [19]
Boscher

[11] Patent Number: 6,049,646
[45] Date of Patent: Apr. 11, 2000

[54] INTEGRATED BURSTER MULTIPLEXER DUPLEXER DEVICE FOR MULTICORE FIBERS

[75] Inventor: Daniel Boscher, Trebeurden, France

[73] Assignee: France Telecom, France

[21] Appl. No.: 09/035,375

[22] Filed: Mar. 5, 1998

[30] Foreign Application Priority Data

Mar. 5, 1997 [FR] France ................................. 97 02607

[51] Int. Cl.[7] .................................................... G02B 6/30
[52] U.S. Cl. .............................. 385/49; 385/52; 385/137
[58] Field of Search ............................... 385/15, 31, 39, 385/49, 51, 52, 136, 137

[56] References Cited

U.S. PATENT DOCUMENTS

| | | | |
|---|---|---|---|
| 4,562,632 | 1/1986 | Parchet et al. | 29/81.1 |
| 4,901,434 | 2/1990 | Sato et al. | 29/753 |
| 5,548,672 | 8/1996 | Hattori et al. | 385/43 |
| 5,608,827 | 3/1997 | Boscher et al. | 385/55 |
| 5,706,380 | 1/1998 | Le Noane et al. | 385/95 |
| 5,712,937 | 1/1998 | Asawa et al. | 385/49 |
| 5,805,757 | 9/1998 | Bloom | 380/137 |
| 5,835,659 | 11/1998 | Ota et al. | 385/137 |

FOREIGN PATENT DOCUMENTS

| | | |
|---|---|---|
| 0171615 | 2/1986 | European Pat. Off. . |
| 0674197 | 9/1995 | European Pat. Off. . |

OTHER PUBLICATIONS

Patent Abstracts of Japan: 59162506 vol. 009, No. 016 (p–329) Jan. 23, 1985.

*Primary Examiner*—John D. Lee
*Assistant Examiner*—Victoria D. Hao
*Attorney, Agent, or Firm*—Blakely Sokoloff Taylor & Zafman

[57] ABSTRACT

A connecting device for multicore fibers includes two superposed substrates each comprising a planar optic with multiple guides so that the guides of the two substrates are disposed in parallel planes that coincide with the cores of the fiber.

29 Claims, 4 Drawing Sheets

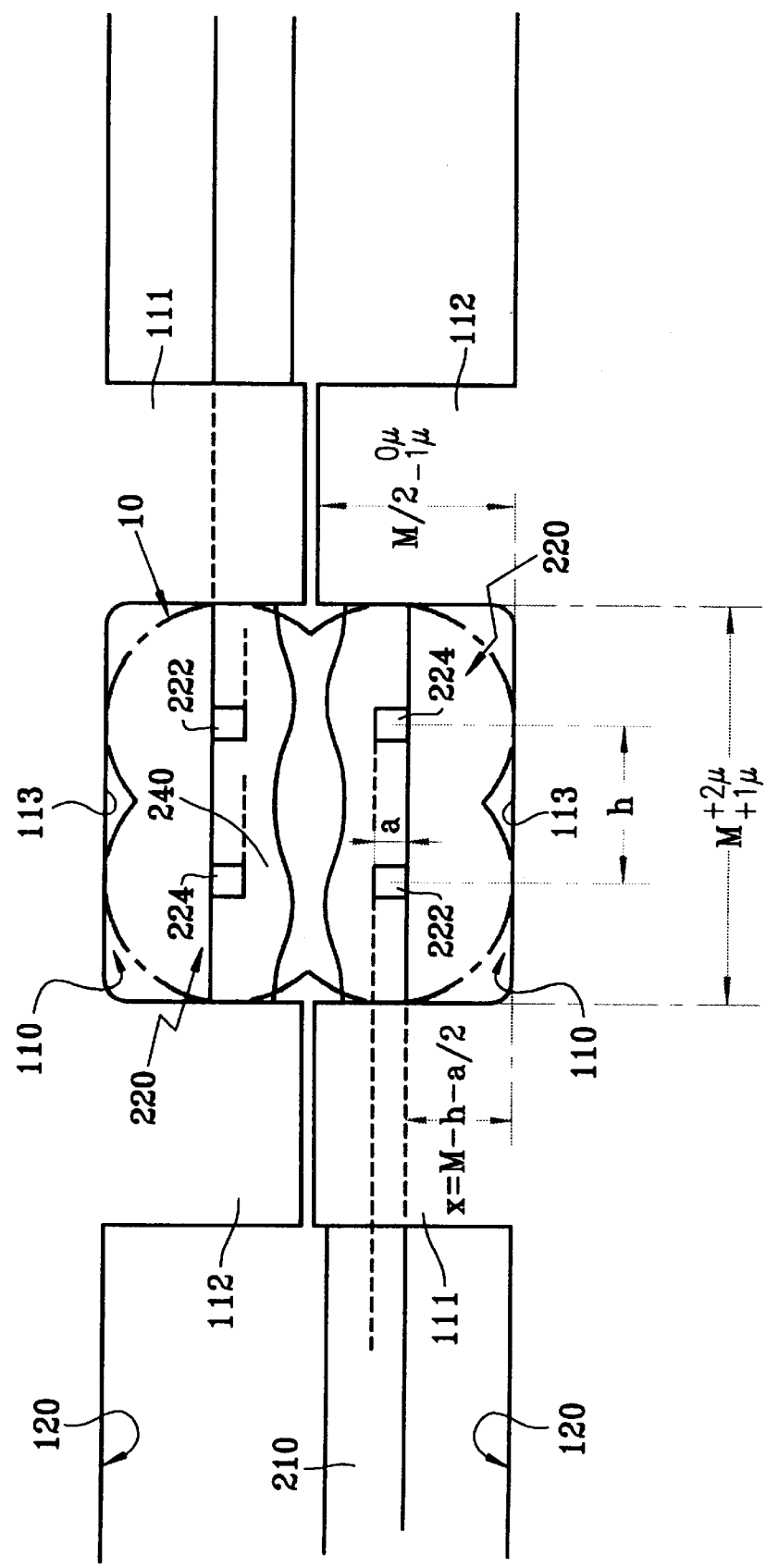

INTEGRATED BURSTER MULTIPLEXER DUPLEXER DEVICE FOR MULTICORE FIBERS

BACKGROUND OF THE INVENTION

1. Field of the Invention

The present invention concerns the field of multicore optical fibers.

To be more precise, the present invention concerns an integrated burster-multiplexer-duplexer device for multicore fibers.

2. Description of the Prior Art

In the context of future deployment of FTTH (Fiber To The Home) networks, the economic aspect of the active component/optical infrastructure combination is essential.

The design and the demonstrated feasibility of multicore fibers has shown that this innovation is of real benefit.

The economic aspects of producing passive and active components suitable for the new fiber are now crucial to the future of dedicated or weakly dedicated FTTH networks.

The concept of multicore fibers, envisaged unsuccessfully in 1978 for multimode fibers, resurfaced in 1991 with the application of monomode fibers and the use of preform technologies offering preforms of very high geometrical quality.

Many documents have been published on multicore fibers. The following documents are cited by way of example:

Document U.S. Pat. No. 5,519,801 concerns small, high-precision multicore optical guides and a method of fabricating such guides.

Document U.S. Pat. No. 5,353,365 concerns multiguide optical conductors.

The document "Bunched multicore monomode fiber: A new key for the future FTTH network" EFOC No. 94 Heidelberg, Le Noane et al, describes results of producing multicore optical fibers, with particular reference to technology, propagation theory and experimental results.

Some documents have been particularly concerned with connection solutions and in particular with bursting multicore fibers for splicing them to a conventional monocore fiber, at one end on the subscriber premises and at the other end to the opto-electronic components of the head end.

Document U.S. Pat. No. 5,608,827 concerns components for connection to a multicore fiber and a method of making them and proposes a pigtailed monobloc component after cylindrical chemical etching of the fibers and assembly in an elastomer mold.

Document FR 2127913 concerns a component for connection to a multicore fiber and a method of producing it and proposes a connectorized component after conical chemical etching of the fibers and assembly in a cylindrical ferrule.

The document "Distribution link components for point to point ultra low cost FTTH network using the bunched multicore monomode fiber design" IOOC 95 Hong Kong, Boscher et al, publishes results of connecting multicore fibers.

An aim of the present invention is now to improve the prior art multicore fiber connecting devices.

SUMMARY OF THE INVENTION

In the context of the present invention this aim is achieved by a connecting device for multicore fibers including two substrates adapted to be superposed and each comprising a planar optic with multiple guides so that the guides of the two substrates are disposed in parallel planes that coincide with the cores of the fiber.

The present invention preferably uses silicon substrates.

The present invention integrates on one substrate all the functions for providing a full duplex double multicore fiber optical link with advantageous overall cost.

The present invention can couple a multicore fiber to multiplexers, couplers and opto-electronic components on a substrate, for example a silicon substrate, with no intermediate connectors, in the case of the system component used at the head end or can couple a fiber, preferably a 4-core fiber, to x (for example 16) individual fibers in the case of application of the proposed component at the branch point.

Other features, aims and advantages of the present invention will become apparent from a reading of the following detailed description given by way of non-limiting example with reference to the appended drawings.

BRIEF DESCRIPTION OF THE DRAWINGS

FIG. 6 is an end view of two superposed substrates in accordance with the present invention.

DETAILED DESCRIPTION OF THE PREFERRED EMBODIMENT

Figure 1:
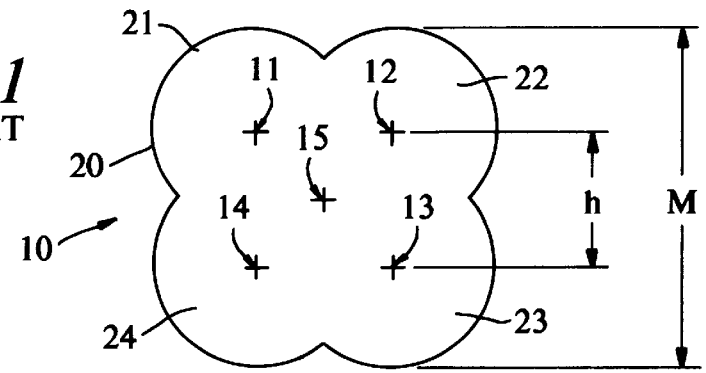
FIG. 1 is a view in cross-section of a multicore fiber.

The appended FIG. 1 shows in cross-section the geometry of a conventional fiber 10 with four cores. A fiber 10 of this kind has four cores 11, 12, 13 and 14 the axes of which coincide with the respective corners of a square centered on the longitudinal axis 15 of the fiber 10. The jacket or outer sheath 20 of the fiber 10 has four lobes, each lobe 21, 22, 23 and 24 being centered on a core axis. A fiber 10 of this kind has a dimension M between two planes respectively tangential to the exterior surface of two pairs of said lobes 21, 22 and 23, 24; it also has a spacing h between cores. Typically, but without limiting the invention, in existing fibers M=125 $\mu$m and h=50 $\mu$m.

Figure 2:
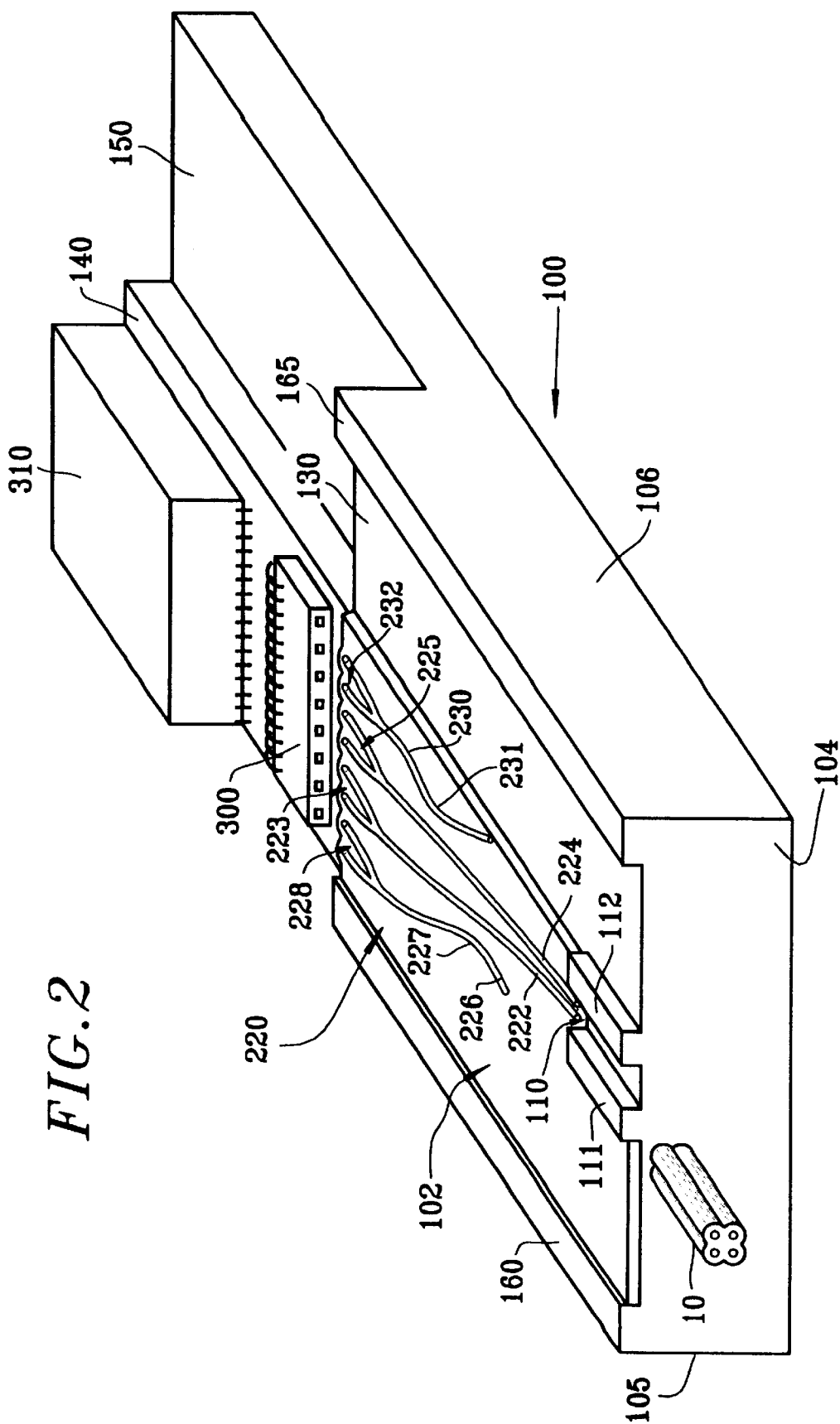
FIG. 2 is a perspective view of a substrate in accordance with the present invention for use at a head end.

The substrate 100 shown in the appended FIG. 2 is advantageously made from silicon and its top surface 102 is etched.

The etching defines a groove 110 of constant rectangular cross-section between two rectilinear walls 111, 112. The width of the groove 110, which corresponds to the distance between the walls 111 and 112, is equal to M+1 $\mu$m or 2 $\mu$m, M designating the aforementioned dimension of the fiber 10 to be connected. The depth of the groove 110 is equal to M/2+0 $\mu$m or −1 $\mu$m. The plane bottom 113 of the groove 110 is parallel to the plane of the top surface of the substrate 100. The groove 110 is therefore adapted to receive half of a multicore fiber 10 and the aligned grooves 110 of two superposed substrates 100 are adapted to receive all of the fiber 10.

The groove 110 is preferably at the center of the width of the substrate 100. The groove 110 is preferably parallel to the longitudinal direction of the substrate 100. Accordingly the walls 111 and 112 are parallel to the longitudinal flanks 105 and 106 of the substrate 100. The groove 110 opens onto a lateral face 104 of the substrate 100. The groove 110 and the walls 111 and 112 that delimit it extend only a limited part of the length of the substrate 100.

The top surface of the substrate has an etching plane 120 adapted to receive a planar silica optic 200 at least over a part of the area around the groove 110 and the walls 111 and 112.

The etching depth of the plane 120 can coincide with that of the groove 110.

The planar optic 200 preferably comprises a primary silica layer 210 deposited on the plane 120, an array of doped silica guides 220 deposited on the primary silica 210 and a covering silica layer 240. In practise guides 220 are preferably square in section.

The top level of the primary silica 210 on which the guides 220 are deposited must be at a distance (M−h−a)/2 from the bottom 113 of the groove 110 so that the ends of the guides 220 that open opposite the groove 110 are centered on respective cores of the fiber 10.

The surface of the substrate 100 adjacent the groove 110 not covered with the planar optic 200 is preferably also etched and set back from the tops of the walls 111 and 112 to form a clearance plane 130. The depth of the plane 130 can be identical to that of the plane 120.

The transverse edge of the planes 120 and 130 opposite the lateral entry face 104 is preferably orthogonal to the longitudinal direction of the substrate 100. Beyond the planes 120, 130, i.e. beyond this transverse edge, the substrate 100 has at least one other etching plane 140, 150 that is preferably deeper than the previously mentioned etching planes 120 and 130.

Figure 4:
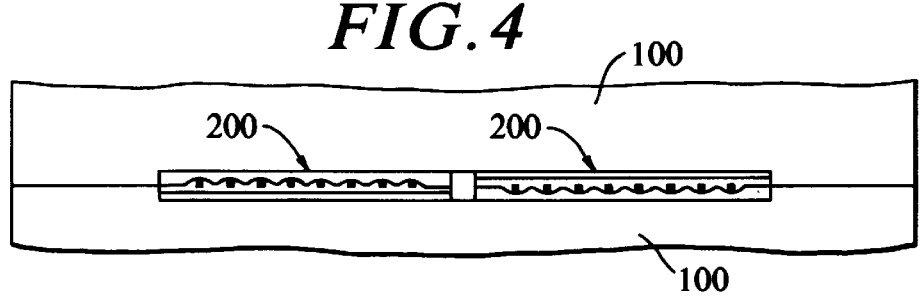
FIG. 4 is an end view of a device in accordance with the present invention as seen in the direction of the arrow IV in FIG. 5.
Figure 5:
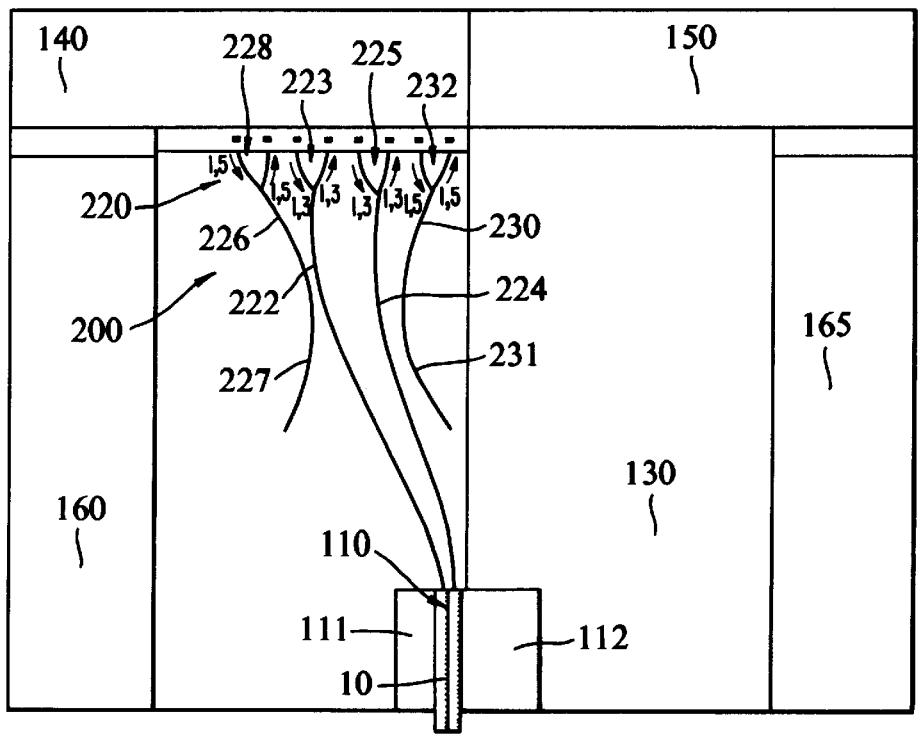
FIG. 5 is a top view of a substrate in accordance with the present invention.
Figure 3:
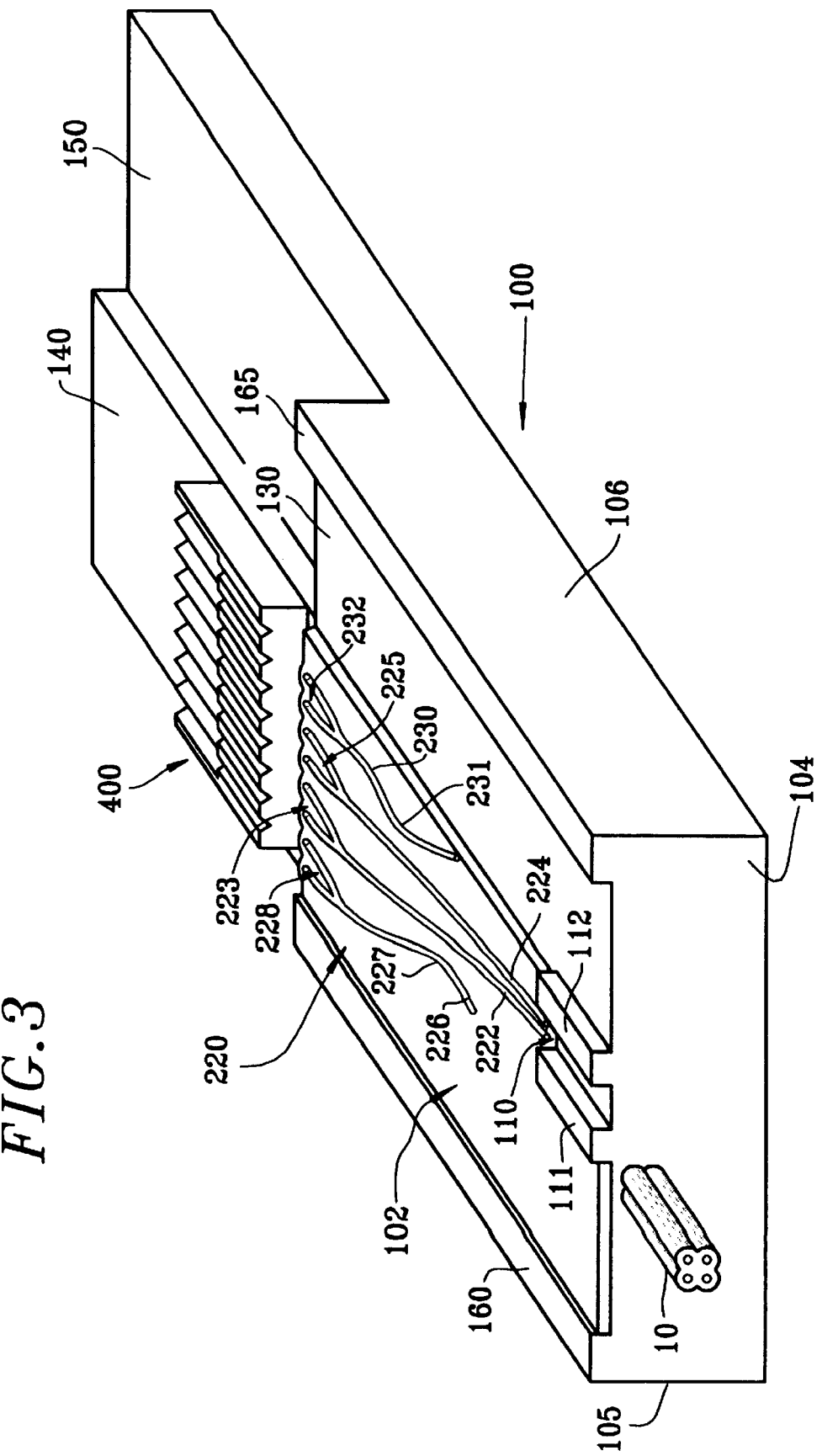
FIG. 3 is a perspective view of a substrate in accordance with the present invention for use at a branch point.

To be even more precise, in the preferred embodiment shown in the appended drawings two additional etching planes are provided beyond the transverse edge of the etching planes 120 and 130. A first etching plane 140 is adapted to receive either a strip of optical components 300 emitting/receiving at 1.3 μm and 1.5 μm and the associated integrated circuits (see FIG. 2) or a support 400 with Vees receiving monocore fibers (see FIG. 3), for example. A second etching plane 150 that is preferably deeper than the plane 140 forms a clearance plane adapted to receive the components 300 or 400 of a complementary, preferably identical, second substrate inverted and facing it as shown in FIG. 4, for example.

Finally note that the substrate 100 preferably has longitudinal shoulders 160 and 165 on the longitudinal edges of the etching planes 120 and 130 having coplanar tops that preferably coincide with the tops of the walls 111 and 112. Thus when the two relatively inverted and facing substrates 100 are superposed as shown in FIG. 4 they are in contact with each other through the walls 111, 112 and the shoulders 160, 165.

The array of doped silica guides 220 can be implemented in many ways.

In the preferred implementation shown in the appended drawings the array of guides 220 comprises two main guides 222 and 224 extending on the primary silica 210 between a first end facing the groove 110 and the aforementioned transverse edge of the etching plane 120. To be more precise, in the vicinity of this transverse edge, each main guide 222 and 224 has a bifurcation 223, 225 allowing a bidirectional connection to and from a 1.3 μm component 300 or 400.

The array of guides 220 further includes two shorter auxiliary guides 226 and 230 which each have a curved portion 227 and 231 near the main guides 222 and 224, respectively, to enabling coupling with the latter of wavelength-selective evanescent waves at a wavelength of 1.5 μm. Each of the auxiliary guides 226 and 230 terminates at the transverse edge of the etching plane 120 in a bifurcation 228 and 232 allowing a bidirectional connection to and from a component 300 or 400.

The other ends of the auxiliary guides 226 and 230 are preferably mechanically treated to avoid excessive reflection here.

A filter cutting off above 1.4 μm can be placed on the 1.3 μm receive guides 222 and 224 and a filter cutting off below 1.4 μm can be placed on the 1.4 μm receive guides.

The array of doped silica guides 220 therefore enables the burster to be adapted to the offset of the position of the cores 11, 12, 13 and 14 of the four-core fiber, to assure 1.3 μm/1.5 μm multiplexing/demultiplexing and transmit/receive coupler functions.

Accordingly the array of guides 220 performs the 1.3 μm/1.5 μm multiplexing function by wavelength-selective coupling and then the conventional 1 to 2 splitter functions at a fixed and precise distance, for example 250 μm.

An exit plane sawn or polished at the ends of the guides 222, 224, 226 and 230 adjacent the components 300 or 400 and not perpendicular to the axis of the guides limits reflection problems.

The component 300 can comprise, for example, a strip of opto-electronic components comprising 1.5 μm emitters, 1.5 μm photodiodes, 1.3 μm emitters and 1.3 μm photodiodes with accurate spacing, for example 250 μm, corresponding to the pitch of the ends of the guides 222, 224, 226 and 230 at the transverse edge of the etching planes 120 and 130. A strip 300 of this kind can be associated with an electronic module 310 comprising driver, pre-amplifier and processor means, for example.

The component 400 comprises a strip provided on its top surface with V-grooves at a pitch identical to that of the eight ends of the guides 222, 224, 226, and 230 at the aforementioned transverse edge to receive monocore optical fibers and their epoxy coating.

The monocore fibers can be aligned with the guides 222, 224, 226 and 230 in a collective dynamic manner or in a static manner. These standard alignment techniques are not described here.

As previously indicated in the context of the present invention two substrates 100, which are preferably identical, are superposed in a face-to-face arrangement so that the aligned grooves 110 assure precise self-centering of the multicore fiber 10 or of a gauge rod of equivalent precision.

After the multicore fiber 10 is installed the two substrates 100 are glued or welded together.

The multicore fiber 10 can be positioned either directly at assembly time by gluing it into the two aligned U-grooves 110 or by means of a connector in which the multicore fiber 10 is free at the end over a length of a few millimeters, cleared with highly accurate positioning relative a reference that bears on the edge of the two substrates 100. In this case it is preferable when etching the central grooves 110 to provide clearance angles to facilitate the insertion of the multicore fiber into the component without precise pre-guidance.

Of course the present invention is not limited to the particular embodiments that have just been described but encompasses any variant thereof within the spirit of the invention.

The present invention exploits the low cost of multicore fibers. It has been shown that the cost per optical core of a multicore fiber is around half that of a conventional fiber.

The invention proposes, for example, an integrated optoelectronic component of small overall size and low cost capable of transmitting eight optically separated bidirectional STM1 streams (standardized bit rate 155 Mbit/s) on the same four-core fiber.

There is claimed:

1. A connecting device for an optical multicore fiber having a plurality of cores disposed in at least two planes, said connecting device including two substrates adapted to be superposed, each substrate having a groove of constant rectangular cross-section extending between two rectilinear walls on a part of a length of said substrate, the width of each groove being complementary to a given dimension of the fiber to be connected and the depth of which is complementary to half said dimension, so that when the two substrates are superposed, the two grooves provided respectively on the substrates are adapted to receive fully an end of said multicore fiber, each substrate comprising a planar optic with multiple guides so that said guides provided respectively on said two substrates are disposed in parallel planes and coincide in use with the cores of the multicore fiber provided in said grooves, and wherein each substrate has furthermore longitudinal shoulders at its longitudinal edges, said shoulders having coplanar tops coincident with the tops of said walls defining the groove for receiving the multicore fiber.

2. The device claimed in claim 1 wherein said substrates are made of silicon.

3. The device claimed in claim 1 for multicore fibers having four cores.

4. The device claimed in claim 1 wherein said planar optic is made of silica.

5. The device claimed in claim 1 wherein said planar optic comprises a primary silica layer, an array of doped silica guides deposited on said primary silica layer and a covering silica layer.

6. The device claimed in claim 1 wherein each substrate has at least one etching plane deeper than an etching plane receiving said planar optic beyond said planar optic.

7. The device claimed in claim 1 wherein said planar optic includes an array of guides that include two main guides and two shorter auxiliary guides each of which has a curved portion near the respective main guide to enable coupling with the latter of a wavelength-selective evanescent wave.

8. The device claimed in claim 7 wherein an end of said auxiliary guides is mechanically treated to prevent excessive reflection threat.

9. The device claimed in claim 1 wherein each guide includes a bifurcation to provide a bidirectional connection.

10. The device claimed in claim 1 wherein said guides of said planar optic are provided with a cut-off filter.

11. The device claimed in claim 1 wherein each substrate carries an electronic processor component.

12. The device claimed in claim 1 wherein each substrate carries a strip having V-grooves on its top surface at a pitch identical to that of the ends of the guides of said planar optic.

13. A connecting device for an optical multicore fiber having four cores the axes of which coincide with the respective corners of a square centered on the longitudinal axis of the fiber, said connecting device including two substrates adapted to be superposed, each substrate having a groove of constant rectangular cross-section extending between two rectilinear walls on a part of a length of said substrate, the width of each groove being complementary to a given dimension of the fiber to be connected and the depth of which is complementary to half said dimension, so that when the two substrates are superposed the two grooves provided respectively on the substrates are adapted to receive fully an end of said multicore fiber, and each substrate comprising a planar optic with at least two main guides so that said main guides provided respectively on said two substrates are disposed in parallel planes and coincide in use with the cores of the multicore fiber provided in said grooves.

14. The device claimed in claim 13 wherein said substrates are made of silicon.

15. The device claimed in claim 13 wherein said planar optic is made of silica.

16. The device claimed in claim 13 wherein said planar optic comprises a primary silica layer, an array of doped silica guides deposited on said primary silica layer and a covering silica layer.

17. The device claimed in claim 13 wherein each substrate has at least one etching plane deeper than an etching plane receiving said planar optic beyond said planar optic.

18. The device claimed in claim 13 wherein each substrate has longitudinal shoulders at its longitudinal edges which have coplanar tops coincident with the tops of said walls defining a groove for receiving a fiber.

19. The device claimed in claim 13 wherein said planar optic further includes two auxiliary guides each of which has a curved portion near the respective main guide to enable coupling with the later of a wavelength-selective evanescent wave.

20. The device claimed in claim 19 wherein an end of said auxiliary guides is mechanically treated to prevent excessive reflection threat.

21. The device claimed in claim 13 wherein each guide includes a bifurcation to provide a bidirectional connection.

22. The device claimed in claim 13 wherein said guides of said planar optic are provided with a cut-off filter.

23. The device claimed in claim 13 wherein each substrate carries an electronic processor component.

24. The device claimed in claim 13 wherein each substrate carries a strip having V-grooves on its top surface at a pitch identical to that of the ends of the guides of said planar optic.

25. A connecting device for an optical multicore fiber having a plurality of cores disposed in at least two planes, said connecting device including two substrates made of silicon adapted to be superposed each substrate having a groove of constant rectangular cross-section extending between two rectilinear walls on a part of a length of said substrate the width of each groove being complementary to a given dimension of the fiber to be connected and the depth of which is complementary to half said dimension, so that when the two substrates are superposed, the two grooves provided respectively on the substrates are adapted to receive fully an end of said multicore fiber, and each substrate comprising a planar optic comprising a primary silica layer, an array of doped silica guides deposited on said primary silica layer and a covering silica layer, with multiple guides so that said guides provided respectively on said two substrates are disposed in parallel planes and coincide in use with the cores of the multicore fiber provided in said grooves.

26. A connecting device for an optical multicore fiber having a plurality of cores disposed on at least two planes, said connecting device including two substrates adapted to be superposed each substrate having a groove of constant rectangular cross-section extending between two rectilinear walls on a part of a length of said substrate, the width of each groove being complementary to a given dimension of the fiber to be connected and the depth of which is complementary to half said dimension, so that when the two substrates are superposed the two grooves provided respectively on the substrates are adapted to receive fully an end of said multicore fiber, each substrate comprising a planar optic including an array of guides that include two main guides and two shorter auxiliary guides each of which has a curved portion near the respective main guide to enable coupling with the latter of a wavelength-selective evanescent wave, so that said main guides provided respectively on said two substrates are disposed in parallel planes and coincide in use with the cores of the multicore fiber provided in said grooves.

27. A connecting device for an optical multicore fiber having a plurality of cores disposed on at least two planes, said connecting device including two substrates adapted to be superposed each substrate having a groove of constant rectangular cross-section extending between two rectilinear walls on a part of a length of said substrate, the width of each groove being complementary to a given dimension of the fiber to be connected and the depth of which is complementary to half said dimension, so that when the two substrates are superposed the two grooves provided respectively on the substrates are adapted to receive fully an end of said multicore fiber, each substrate comprising a planar optic including an array of guides that include two main guides and two shorter auxiliary guides each of which has a curved portion near the respective main guide to enable coupling with the latter of a wavelength-selective evanescent wave, each guide including a bifurcation to provide a bidirectional connection and an end of said auxiliary guides being mechanically treated to prevent excessive reflection threat, so that said mean guides provided respectively on said two substrates are disposed in parallel planes and coincide in use with the cores of the multicore fiber provided in said grooves.

28. A connecting device for an optical multicore fiber having a plurality of cores disposed on at least two planes, said connecting device including two substrates adapted to be superposed each substrate having a groove of constant rectangular cross-section extending between two rectilinear walls on a part of a length of said substrate, the width of each groove being complementary to a given dimension of the fiber to be connected and the depth of which is complementary to half said dimension, so that when the two substrates are superposed the two grooves provided respectively on the substrates are adapted to receive fully an end of said multicore fiber, each substrate comprising a planar optic with multiple guides so that said guides provide respectively said two substrates are disposed in parallel planes and coincide in use with the cores of the multicore fiber provided in said grooves, wherein each substrate has at least one etching plane deeper than an etching plane receiving said planar optic beyond said planar optic, and wherein at least one of the two substrates carries an electronic processor component.

29. A connecting device for an optical multicore fiber having a plurality of cores disposed on at least two planes, said connecting device including two substrates adapted to be superposed each substrate having a groove of constant rectangular cross-section extending between two rectilinear walls on a part of a length of said substrate, the width of each groove being complementary to a given dimension of the fiber to be connected and the depth of which is complementary to half said dimension, so that when the two substrates are superposed the two grooves provided respectively on the substrates are adapted to receive fully an end of said multicore fiber each substrate comprising, a planar optic with multiple guides so that said guides provided respectively and said two substrates are disposed in parallel planes and coincide in use with the cores of the multicore fiber provided in said grooves, wherein each substrate has at least one etching plane deeper than an etching plane receiving said planar optic beyond said planar optic, and wherein at least one of the two substrates carries a strip having V-grooves on its top surface at a pitch identical to that of the ends of the guides of said planar optic.

* * * * *